(12) United States Patent
Kim

(10) Patent No.: US 7,971,888 B2
(45) Date of Patent: Jul. 5, 2011

(54) SUSPENSION SYSTEM FOR VEHICLE

(75) Inventor: Jae Hun Kim, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 86 days.

(21) Appl. No.: 12/498,741

(22) Filed: Jul. 7, 2009

(65) Prior Publication Data

US 2010/0059959 A1   Mar. 11, 2010

(30) Foreign Application Priority Data

Sep. 8, 2008  (KR) .................. 10-2008-0088266

(51) Int. Cl.
*B60G 9/02* (2006.01)
*B60G 21/055* (2006.01)

(52) U.S. Cl. .................. 280/124.116; 280/124.103

(58) Field of Classification Search .......... 280/124.116, 280/124.103, 124.106, 124.13, 124.156, 280/124.1, 124.11

See application file for complete search history.

(56) References Cited

U.S. PATENT DOCUMENTS

| | | | |
|---|---|---|---|
| 7,556,272 B2* | 7/2009 | Marchel | 280/124.103 |
| 2006/0131829 A1* | 6/2006 | Alesso et al. | 280/124.166 |
| 2007/0075518 A1* | 4/2007 | Murata | 280/124.166 |
| 2009/0014975 A1* | 1/2009 | Lee | 280/124.116 |
| 2010/0066049 A1* | 3/2010 | Kobayashi | 280/124.116 |
| 2010/0072724 A1* | 3/2010 | Toepker | 280/124.106 |
| 2010/0133774 A1* | 6/2010 | Lee | 280/124.116 |
| 2010/0187788 A1* | 7/2010 | Choi et al. | 280/124.106 |

FOREIGN PATENT DOCUMENTS

| | | |
|---|---|---|
| JP | 2005-8123 A | 1/2005 |
| JP | 2006-1295 A | 1/2006 |
| KR | 10-2007-0063844 A | 6/2007 |

* cited by examiner

*Primary Examiner* — Paul N Dickson
*Assistant Examiner* — Karen A Beck
(74) *Attorney, Agent, or Firm* — Morgan, Lewis & Bockius LLP

(57) ABSTRACT

A suspension system for a vehicle may include a torsion beam disposed along width direction of the vehicle and including an attaching portion formed to an end portion thereof, a trailing arm disposed to the attaching portion of the torsion beam and aligned along length direction of the vehicle, wherein one end portion of the trailing arm is coupled to a wheel and the other end portion of the trailing arm is connected to a vehicle body, and a stiffener connecting the attaching portion of the torsion beam and the trailing arm disposed between the stiffener and the attaching portion of the torsion beam.

7 Claims, 6 Drawing Sheets

SUSPENSION SYSTEM FOR VEHICLE

CROSS-REFERENCE TO RELATED APPLICATION

The present application claims priority to Korean Patent Application Number 10-2008-0088266 filed Sep. 8, 2008, the entire contents of which application is incorporated herein for all purposes by this reference.

BACKGROUND OF THE INVENTION

1. Field of the Invention

The present invention relates to a suspension system for a vehicle. More particularly, the present invention relates to a suspension system for a vehicle that may firmly connect a torsion beam and a trailing arm so that stiffness is enhanced.

2. Description of Related Art

Generally, a suspension system of a vehicle absorbs shocks transmitted from a road while a vehicle drives and controls vehicle body dynamics during acceleration, deceleration, and cornering.

A general torsion beam type suspension system, as shown in FIG. 6, includes a torsion beam 102 disposed along width direction of a vehicle body 101 and a trailing arm 104 and 106 disposed to an end of the torsion beam 102 along length direction of the vehicle body 101. And a wheel supporter 112 and 114 is disposed to one end of the trailing arm 104 and 106 for rotatably supporting a wheel 108 and 110.

A mounting portion 116 and 118 is formed to the other end of the trailing arm 104 and 106 and a rubber bushing 120 and 122 is disposed between the mounting portion 116 and 118 and the vehicle body 101. And a shock-absorbing member, such as a coil spring and a shock-absorber (not shown) is disposed in rear of the trailing arm 104 and 106.

When rear part of the trailing arm 104 and 106 bounces up and down according to road conditions, the suspension system pivots around the mounting portion 116 and 118, and vibration and impact are attenuated by the shock-absorbing member simultaneously the rubber bushing 120 and 122 absorbs vibration and impact too.

In the general suspension system, because of a gap between the torsion beam 102 and an axle, it is required to reinforce a connecting portion of the torsion beam 102 and the trailing arm 104 and 106 so that a plane type stiffener 124 and 126 is usually disposed thereto.

However, for satisfying torsional strength, it is required to increase a thickness of the stiffener because a cross section of the torsion beam is shaped as "V". And increasing a thickness of the stiffener induces increasing weight of the total system.

Practically, increasing a thickness and width of a torsion beam is more effective to improve performance than increasing thickness of a stiffener.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a suspension system for a vehicle having advantages of increased rigidity for connecting a torsion beam and a trailing arm.

A suspension system for a vehicle, may include a torsion beam disposed along width direction of the vehicle and including an attaching portion formed to an end portion thereof, a trailing arm disposed to the attaching portion of the torsion beam and aligned along length direction of the vehicle, wherein one end portion of the trailing arm is coupled to a wheel and the other end portion of the trailing arm is connected to a vehicle body, and a stiffener connecting the attaching portion of the torsion beam and the trailing arm disposed between the stiffener and the attaching portion of the torsion beam.

A cross section of the trailing arm may be rectangular.

The attaching portion may include an attaching plane and formed to be lower than upper edge of the torsion beam to receive the trailing arm thereto, wherein the attaching portion further includes a slanted portion connecting the upper edge and the attaching plane with a predetermined angle for the upper edge of the torsion beam and an upper lateral side of the trailing arm to be substantially collinear.

A cross section of the stiffener may be configured to correspond to a cross section of the torsion beam.

The stiffener may include an upper connecting protrusion protruding from an upper end portion of the stiffener toward the trailing arm, wherein a length of the upper connecting protrusion is substantially the same as the width of the tailing arm, wherein the stiffener further includes at least a lower connecting protrusion protruding from a lower end portion of the stiffener toward the trailing arm, wherein a length of the lower connecting protrusion is substantially the same as the length of the upper connecting protrusion, and wherein a length of the lower connecting protrusion is substantially the same as the width of the tailing arm, wherein the upper connecting protrusion and the lower connecting protrusion form at least a connecting hole for the trailing arm to be inserted thereinto.

The upper connecting protrusion and the lower connecting protrusion may form a triangular shape therebetween.

The attaching portion may include an attaching plane and the attaching plane is configured to be lower than upper edge of the torsion beam and to be substantially the same level as the lower connecting protrusion to receive the trailing arm thereto, wherein the upper connecting protrusion and the lower connecting protrusion form a triangular shape.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
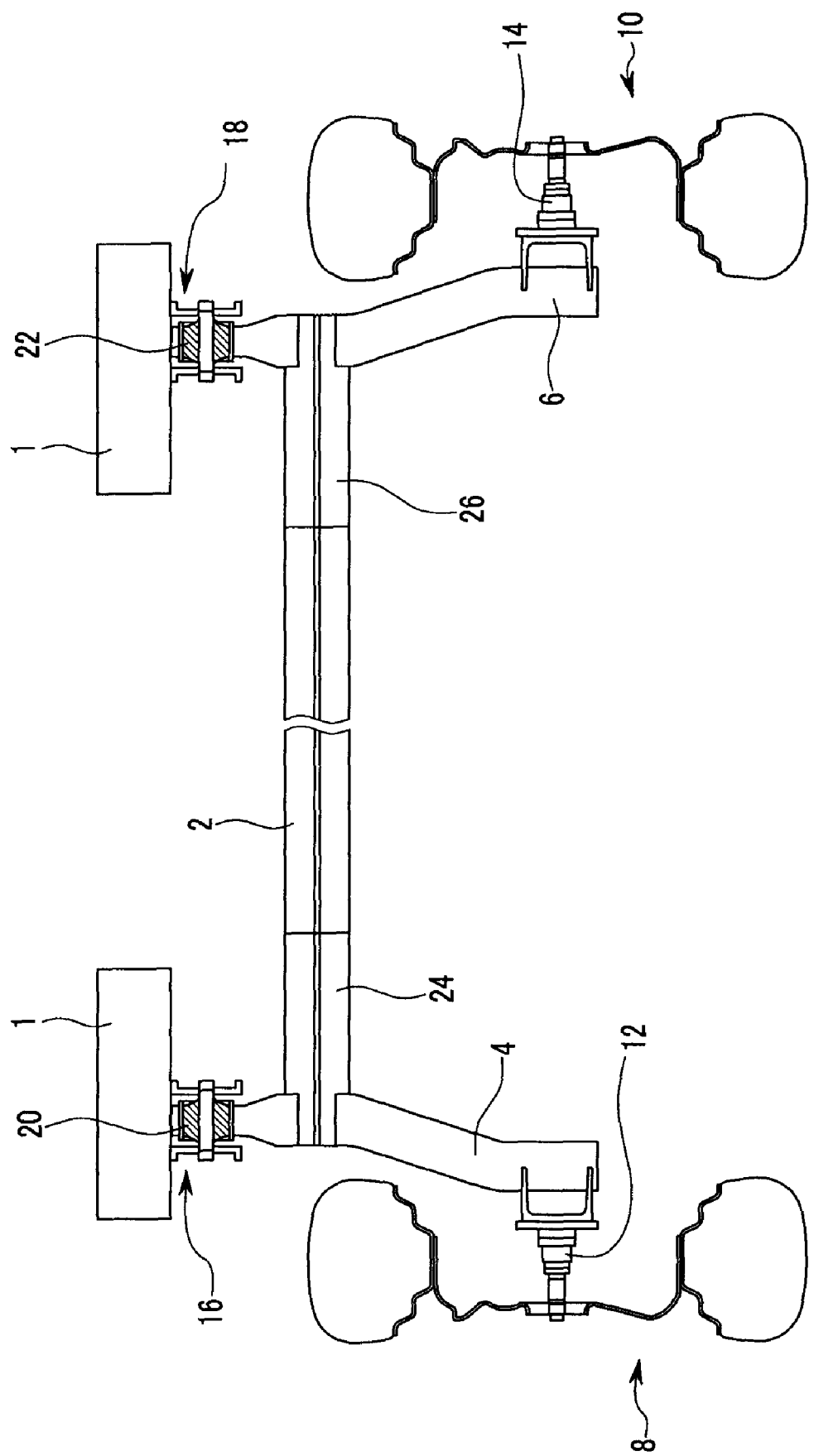
FIG. 1 is a top plan view of an exemplary suspension system for a vehicle according to the present invention.

FIG. 1 is a top plan view of a suspension system for a vehicle according to various embodiments of the present invention and a torsion beam is indicated as "2".

Figure 2:
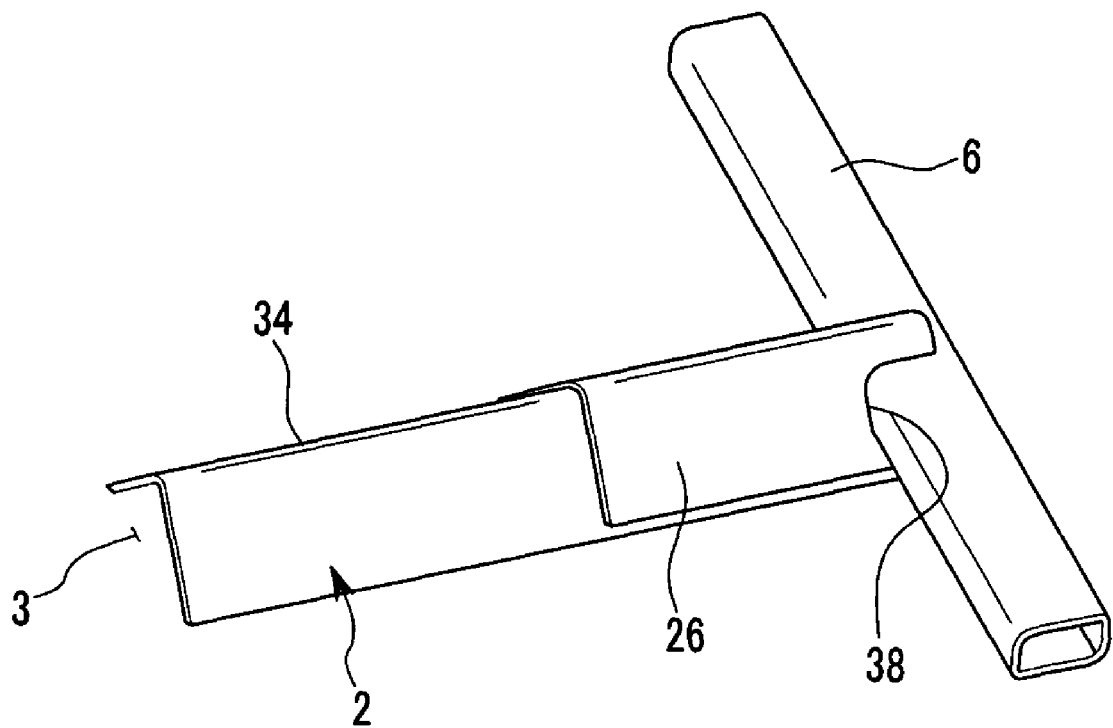
FIG. 2 is a perspective view showing an exemplary connection of a torsion beam, a trailing arm and a stiffener according to the present invention.
Figure 3:
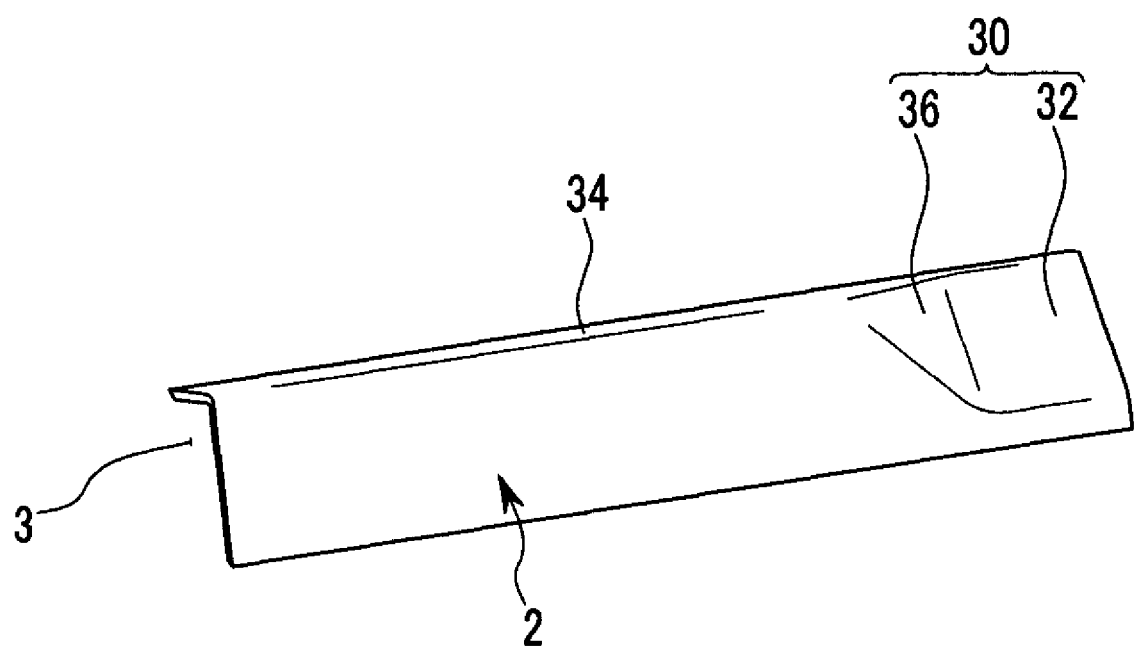
FIG. 3 is a drawing showing the torsion beam of FIG. 2.
Figure 5:
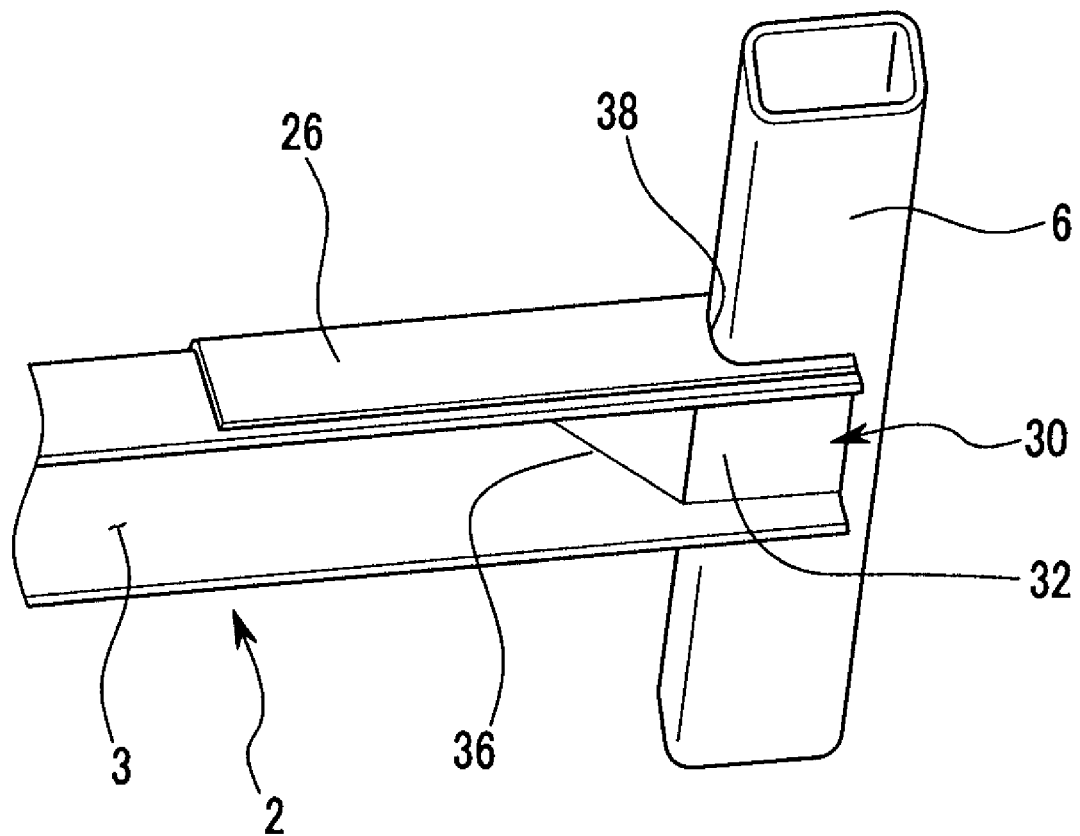
FIG. 5 is a perspective view of FIG. 2 from another angle.
Figure 6:
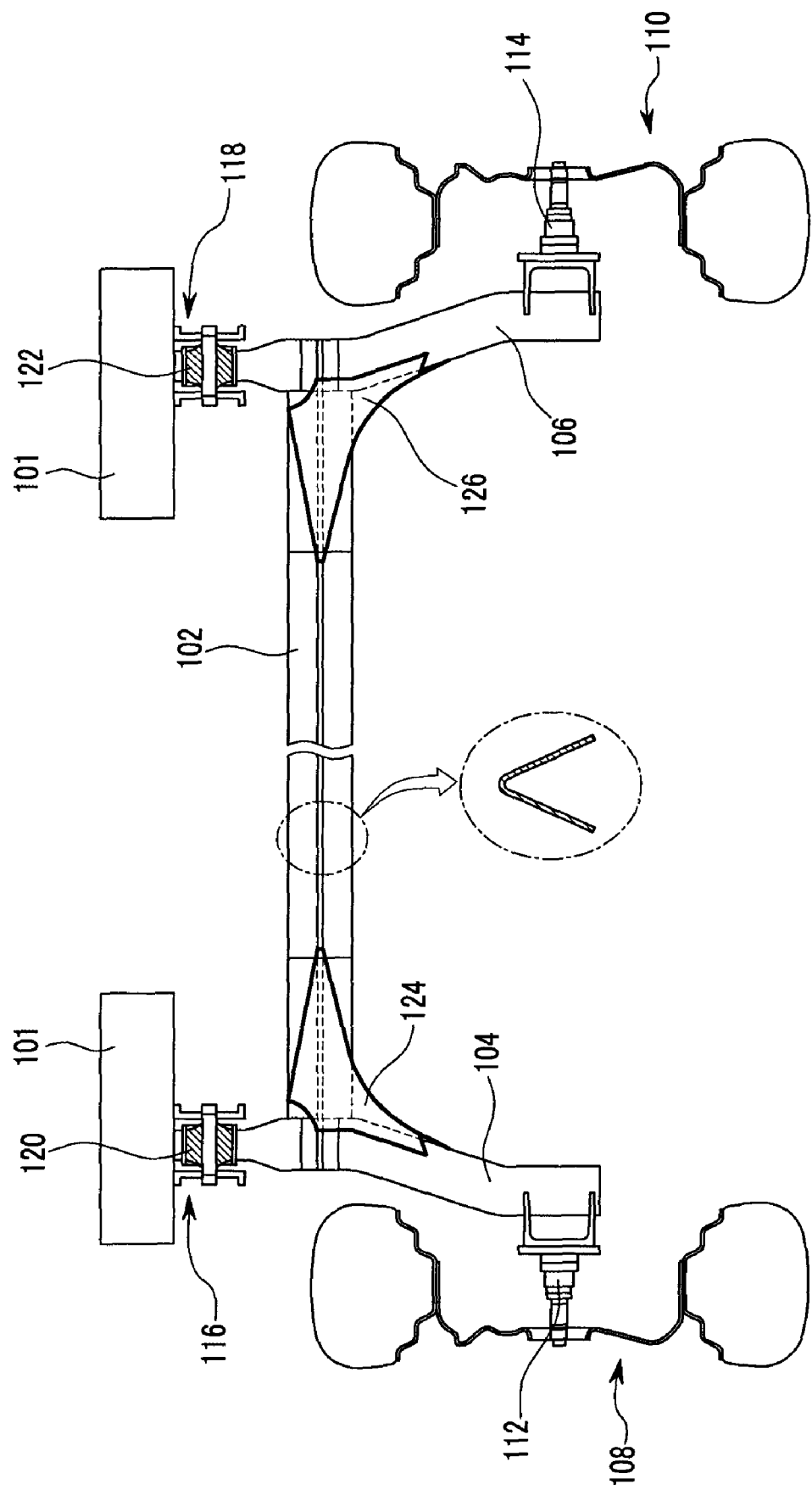
FIG. 6 is a top plan view of a conventional suspension system for a vehicle.

A cross section of the torsion beam 2 is shaped as "V" or "U", an opening 3 (referring to FIG. 2, FIG. 3 and FIG. 5) of the torsion beam 2 is formed downwardly and the torsion beam 2 is disposed along width direction of a vehicle body 1.

Trailing arms 4 and 6 are connected to each end portion of the torsion beam along length direction of the vehicle body 1 by welding and so on. A wheel supporter 12 and 14 is disposed to one end of the trailing arm 4 and 6 for rotatably supporting a wheel 8 and 10.

A mounting portion 16 and 18 is formed to the other end of the trailing arm 4 and 6 and a rubber bushing 20 and 22 is disposed between the mounting portion 16 and 18 and the vehicle body 1 and a shock-absorbing member, such as a coil spring and a shock-absorber (not shown) is disposed in rear of the trailing arm 4 and 6.

When rear part of the trailing arm 4 and 6 bounces up and down according to road conditions, the suspension system pivots around the mounting portion 16 and 18, and vibration and impact are attenuated by the shock-absorbing member while the rubber bushing 20 and 22 absorbs vibration and impact.

In the suspension system according to various embodiments of the present invention, a stiffener 24 and 26 is disposed to a connecting portion of the torsion beam 2 and the trailing arm 4 and 6 and a cross section of the stiffener 24 and 26 is corresponding to the cross section of the torsion beam 2.

Hereinafter, referring to FIG. 2 to FIG. 5, connections of right side of the trailing arm 6 in FIG. 1 will be explained.

A cross section of a conventional trailing arm is generally formed as a round tube shape while a cross section of the trailing arm 6 according to various embodiments of the present invention is formed as a rectangular tube shape.

The cross section of the torsion beam 2 is shaped as "V" or "U", the opening 3 of the torsion beam 2 is formed downwardly and an attaching portion 30 is formed to an upper portion where the trailing arm 6 is positioned on.

The attaching portion 30 includes an attaching plane 32, which is pressed and contacts a lower side of the trailing arm 6, and a slanted portion 36, which connects the attaching plane 32 and an upper edge 34 of the torsion beam 2.

Differences of a height of the upper edge 34 of the torsion beam 2 and a height of the attaching plane 32 correspond to a height of the trailing arm 6 so that the upper edge 34 of the torsion beam 2 and an upper side of the trailing arm 6 is substantially collinear when the trailing arm 6 is positioned on the attaching plane 32.

Thus, the trailing arm 6 is positioned onto the attaching portion 30 and then the stiffener 26 is connected to the trailing arm 6 and the torsion beam 2 for reinforcing the end portion of the torsion beam 2 and the upper portion of the trailing arm 6.

Figure 4:
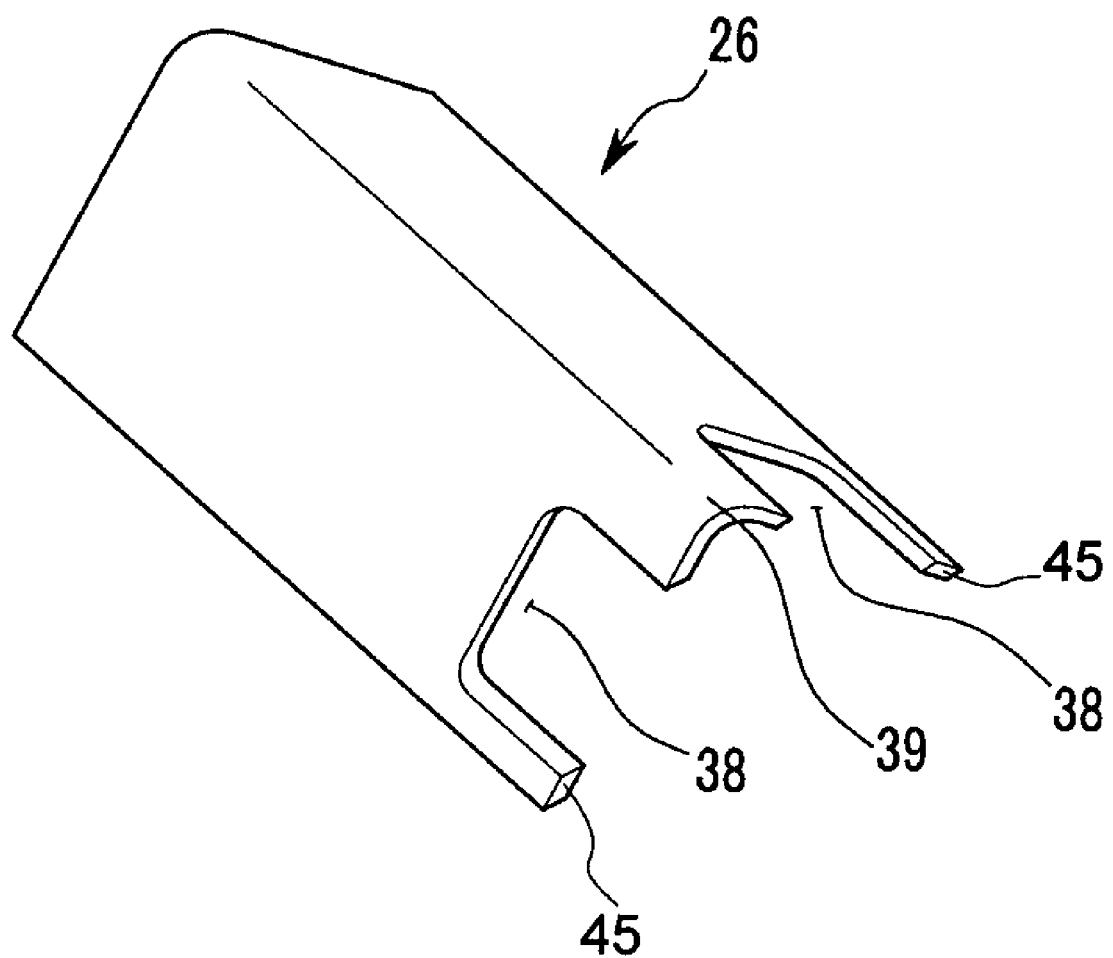
FIG. 4 is a drawing showing the stiffener of FIG. 2.

A cross section of the stiffener 26, as shown in FIG. 4, is formed as "V" shape for close adhesion to the torsion beam 2 and a connecting hole 38 is formed to an end of the stiffener 26 for the trailing arm 6 to be inserted thereinto.

The trailing arm 6 is inserted into the connecting holes 38 and mounted on the attaching plane 32 of the torsion beam 2 and the trailing arm 6 are connected by welding.

Upper and lower connecting protrusions 39 and 45 may be formed to the connecting hole 38 for fixing the trailing arm 6.

In various embodiments of the present invention, the upper and lower connecting protrusions 39 and 45 may form a triangular shape so as to distribute a load applied to the stiffener 26.

Thus, as shown in FIG. 2 to FIG. 5, assembling of the torsion beam 2 and the trailing arm 6 is completed.

As described above, the trailing arm 6 is connected to the attaching portion 30 of the torsion beam 2 and the stiffener 26 reinforces the torsion beam 2 and the trailing arm 6 so that the connection can be stable and firm.

With above described scheme, it is easy to adjust lengths, thicknesses, widths and so on of the attaching portion 30, the stiffener 26 and trailing arm 6 so that it is easy to prepare to lateral stiffness or torsional rigidity.

The scheme of the connection of the stiffener 26, the torsion beam 2 and the trailing arm 6 is simple so that the total size of the suspension system can be minimized.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A suspension system for a vehicle having a vehicle body, comprising:

a torsion beam disposed along a width direction of the vehicle and including an attaching portion formed on an end portion thereof;

a trailing arm mounted on the attaching portion of the torsion beam and aligned along a length direction of the vehicle, wherein one end portion of the trailing arm is coupled to a wheel and the other end portion of the trailing arm is connected to the vehicle body; and a stiffener disposed on the attaching portion of the torsion beam and interconnecting the trailing arm and the attaching portion of the torsion beam;

wherein the stiffener includes an upper connecting protrusion protruding from an upper end portion of the stiffener toward the trailing arm;

wherein the stiffener further includes at least a lower connecting protrusion protruding from a lower end portion of the stiffener toward the trailing arm;

wherein the upper connecting protrusion and the lower connecting protrusion form at least a connecting hole for the trailing arm to be inserted thereinto; and wherein the attaching portion includes an attaching plane and a slanted portion connecting an upper edge of the torsion beam for the trailing arm to be disposed on the attaching plane.

2. The suspension system for a vehicle of claim 1, wherein a cross section of the trailing arm is rectangular.

3. The suspension system for a vehicle of claim 1, wherein a cross section of the stiffener corresponds with a cross section of the torsion beam.

4. The suspension system for a vehicle of claim 1, wherein a length of the upper connecting protrusion is substantially the same as the width of the tailing arm.

5. The suspension system for a vehicle of claim 1, wherein a length of the lower connecting protrusion is substantially the same as the length of the upper connecting protrusion.

6. The suspension system for a vehicle of claim 1, wherein a length of the lower connecting protrusion is substantially the same as the width of the tailing arm.

7. A vehicle comprising a vehicle body and the suspension system of claim 1.

* * * * *